Figure 1B:
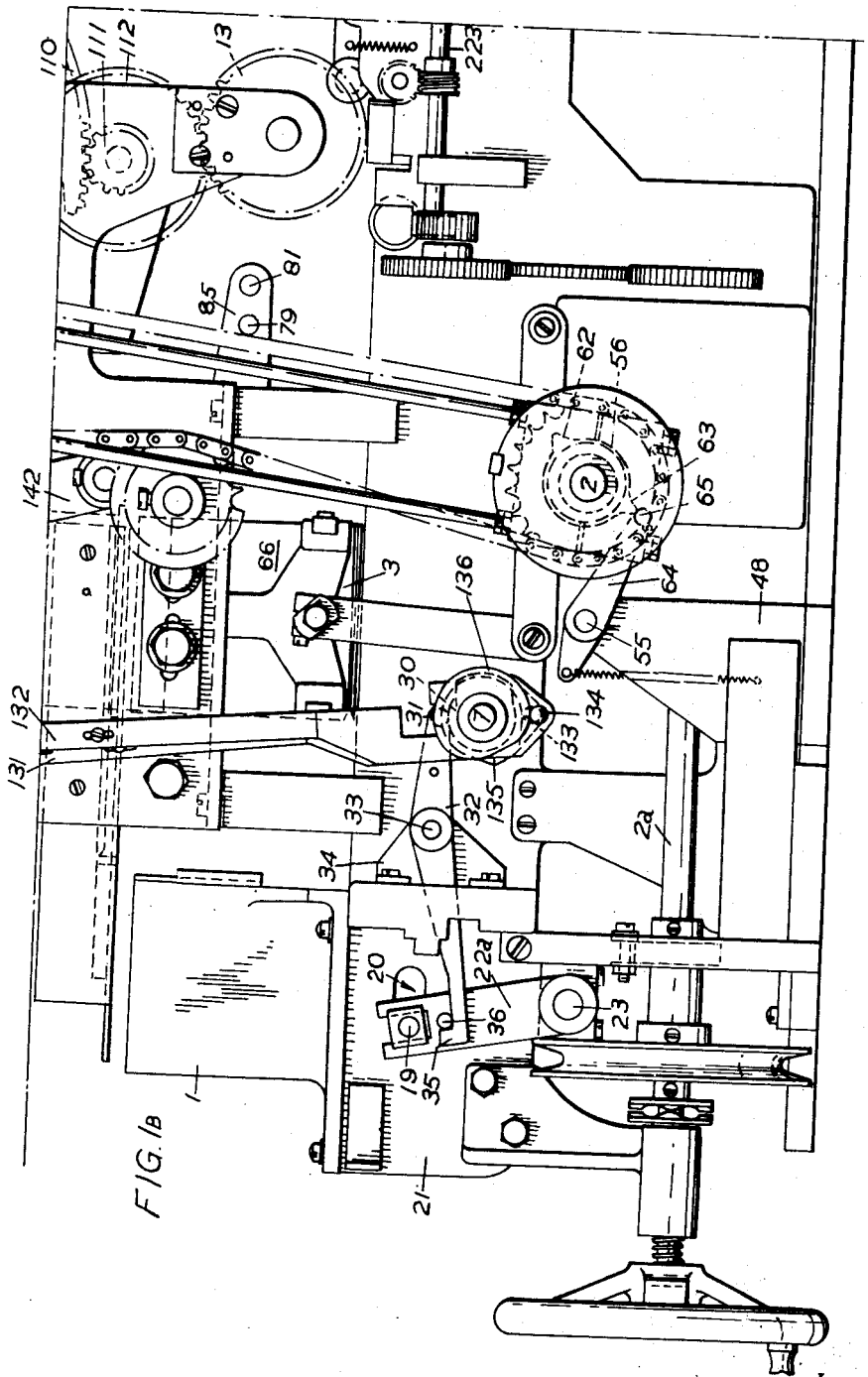

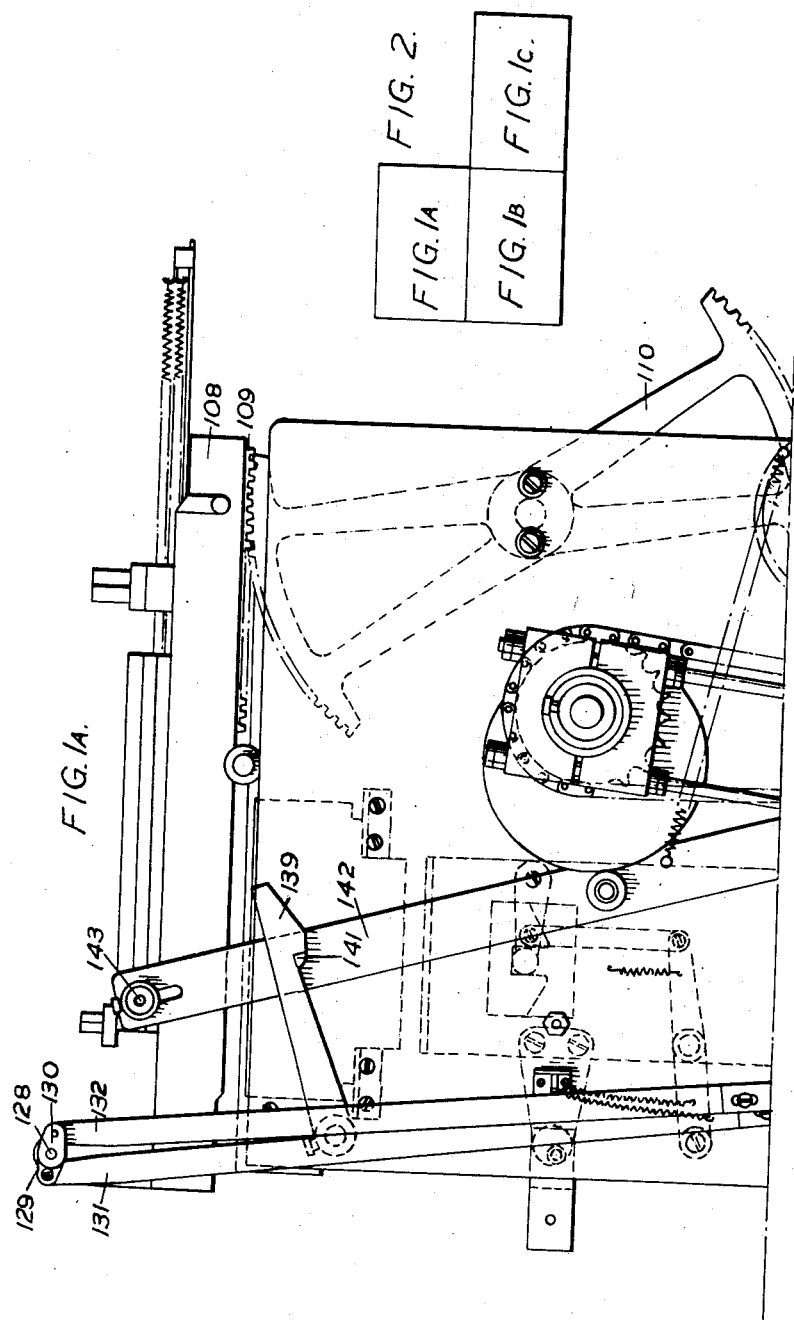

Nov. 17, 1953 A. W. EXCELL 2,659,302
RECORD CARD CONTROLLED SENSING AND PRINTING MEANS
Filed Aug. 22, 1950 14 Sheets-Sheet 2

Inventor
ARTHUR WILLIAM EXCELL

By *J. L. Sterling*
Attorney

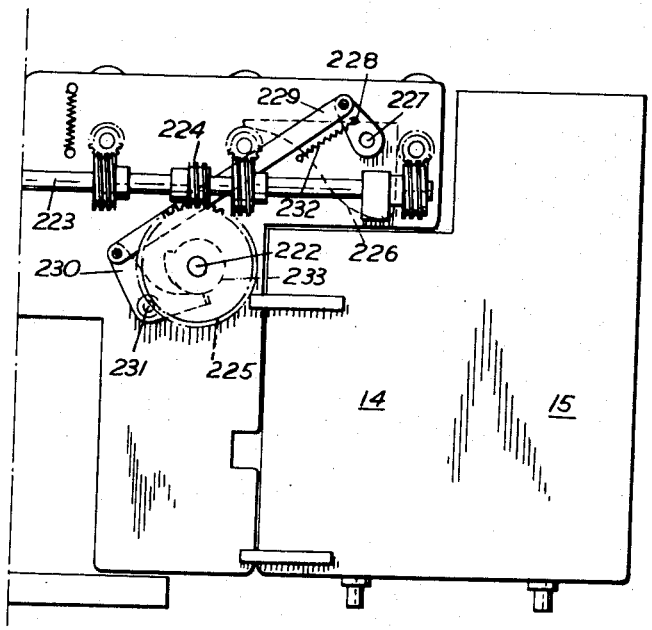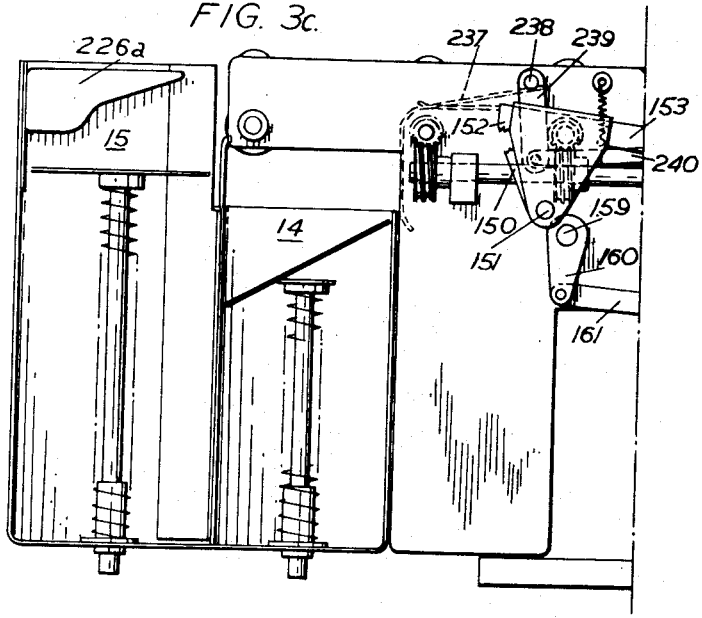

Nov. 17, 1953 A. W. EXCELL 2,659,302
RECORD CARD CONTROLLED SENSING AND PRINTING MEANS
Filed Aug. 22, 1950 14 Sheets-Sheet 4
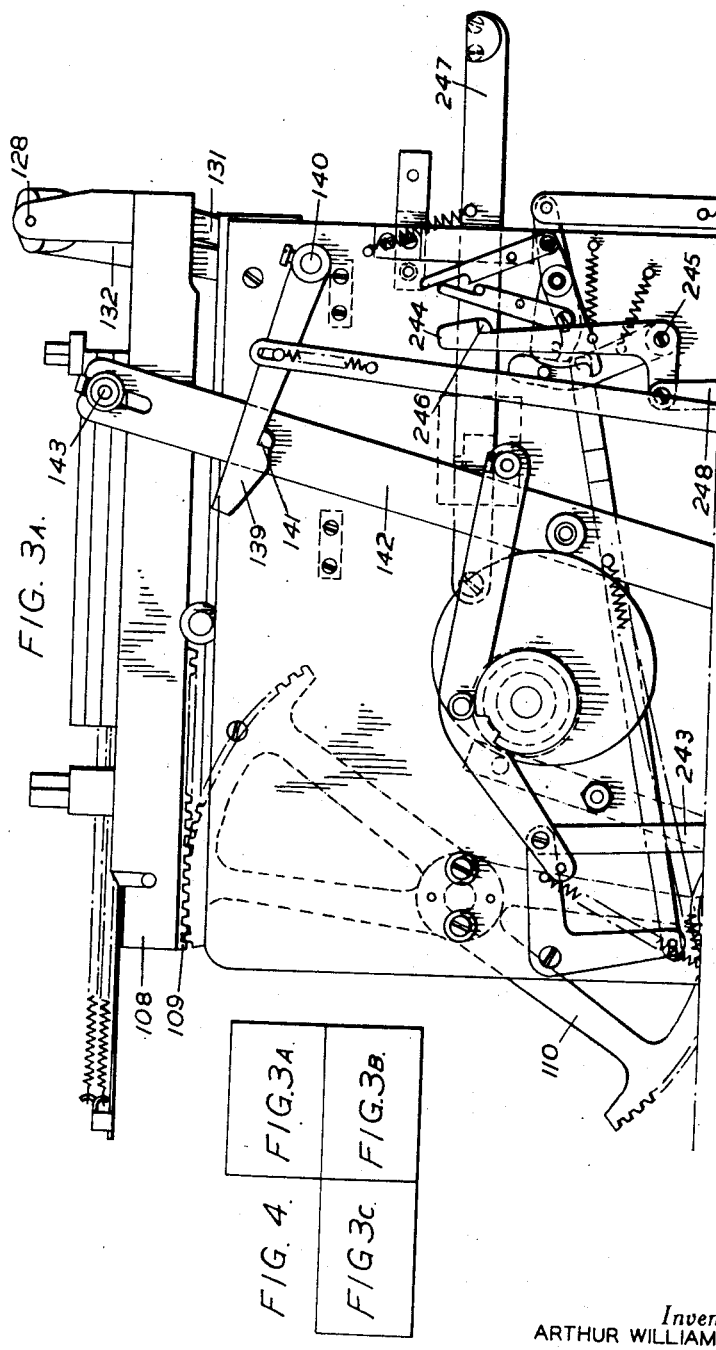
*Inventor*
ARTHUR WILLIAM EXCELL
By *JhL Sterling*
*Attorney*

Nov. 17, 1953                A. W. EXCELL                2,659,302
            RECORD CARD CONTROLLED SENSING AND PRINTING MEANS
Filed Aug. 22, 1950                                   14 Sheets-Sheet 5
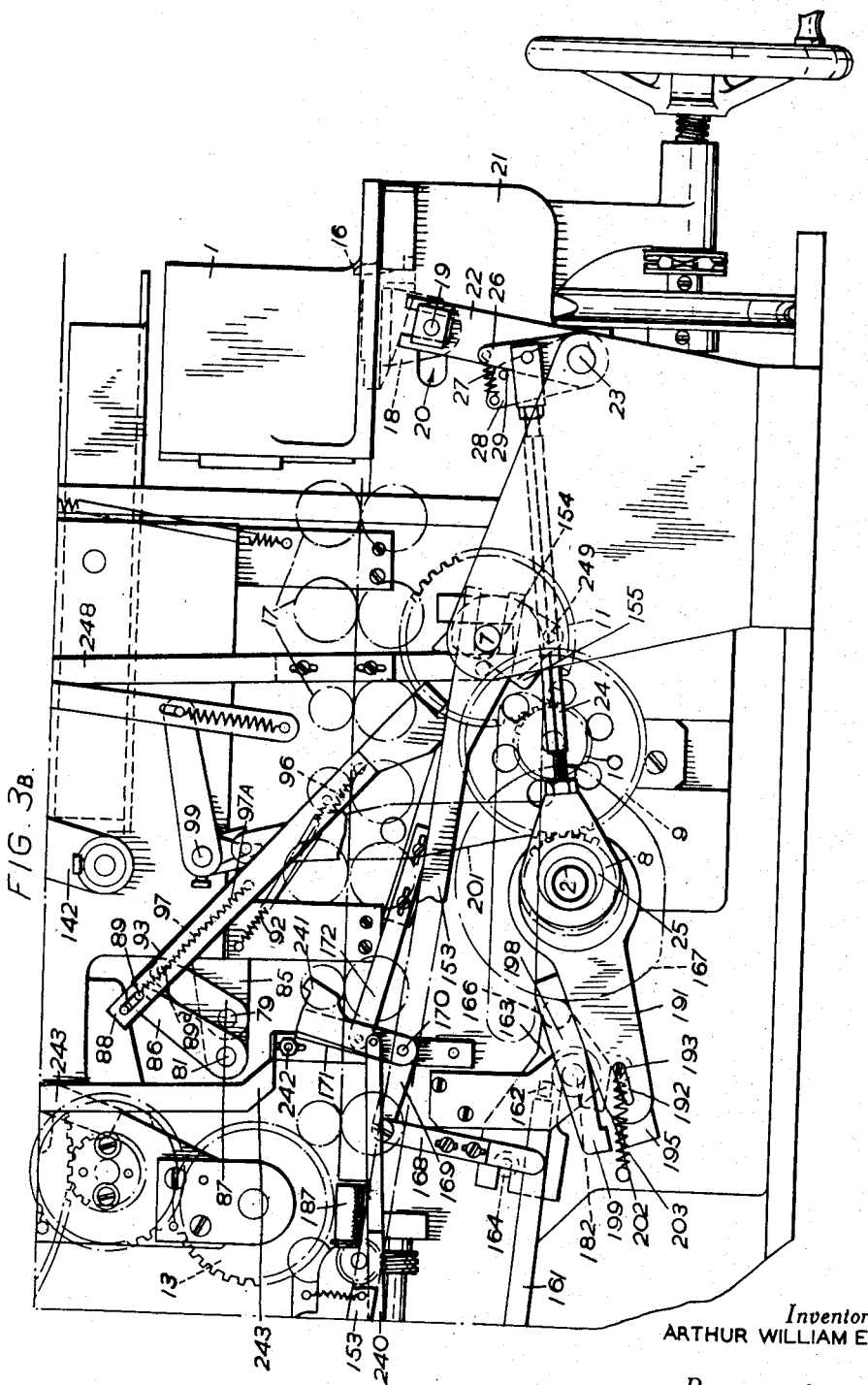
Inventor
ARTHUR WILLIAM EXCELL
By *JL C Sterling*
                    Attorney

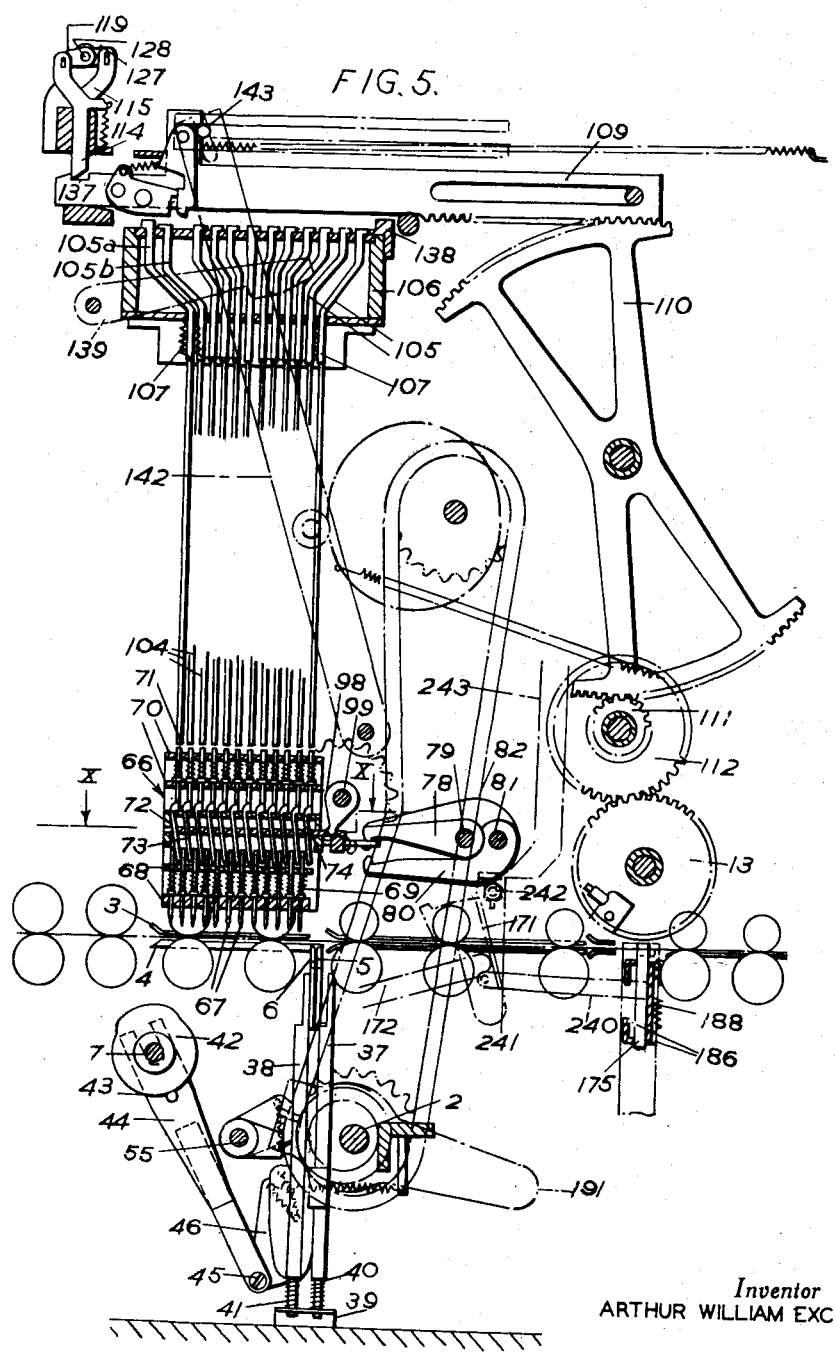

Nov. 17, 1953    A. W. EXCELL    2,659,302
RECORD CARD CONTROLLED SENSING AND PRINTING MEANS
Filed Aug. 22, 1950    14 Sheets-Sheet 7

Inventor
ARTHUR WILLIAM EXCELL

By *John L. Sterling*
Attorney

Nov. 17, 1953  A. W. EXCELL  2,659,302
RECORD CARD CONTROLLED SENSING AND PRINTING MEANS
Filed Aug. 22, 1950  14 Sheets-Sheet 8

Inventor
ARTHUR WILLIAM EXCELL

By *J. L. Sterling*
Attorney

Nov. 17, 1953　　　　　　　A. W. EXCELL　　　　　　2,659,302
RECORD CARD CONTROLLED SENSING AND PRINTING MEANS
Filed Aug. 22, 1950　　　　　　　　　　　　　14 Sheets-Sheet 9
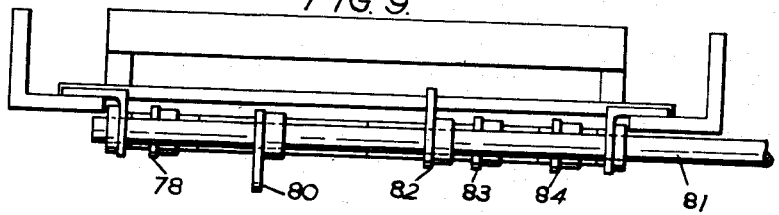
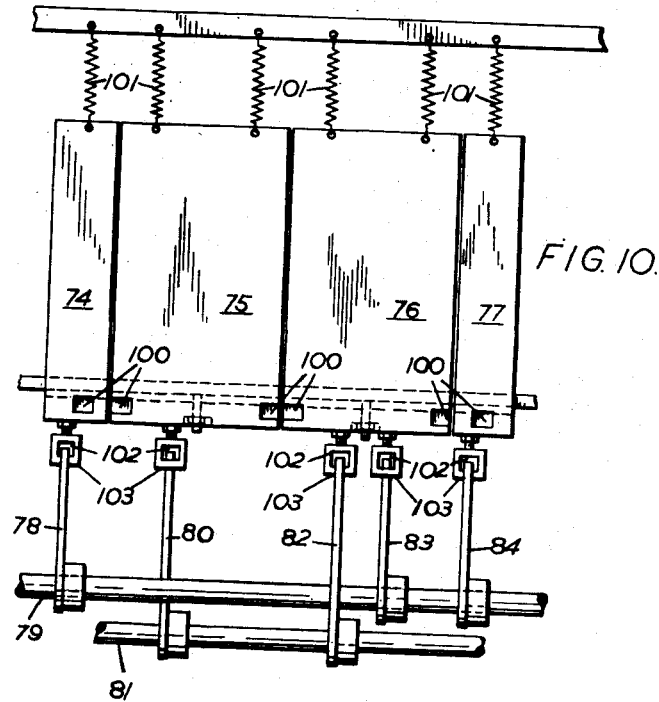
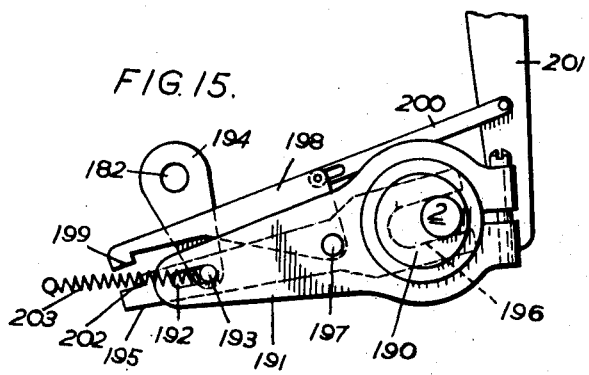
Inventor
ARTHUR WILLIAM EXCELL
By *J. L. Sterling*
　　Attorney Nov. 17, 1953　　　　　A. W. EXCELL　　　　2,659,302
RECORD CARD CONTROLLED SENSING AND PRINTING MEANS
Filed Aug. 22, 1950　　　　　　　　　　　　14 Sheets-Sheet 10
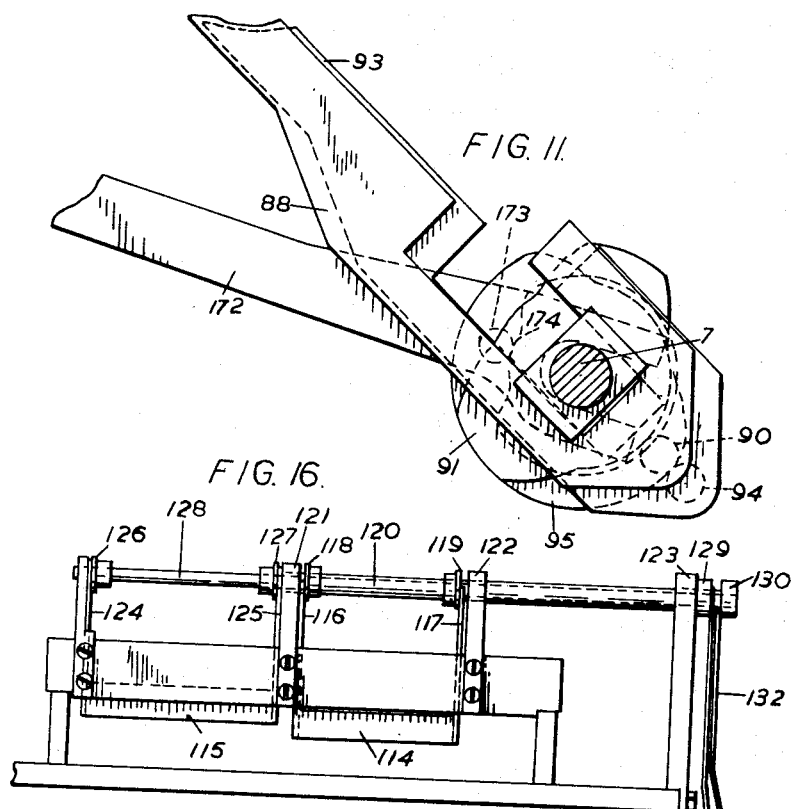
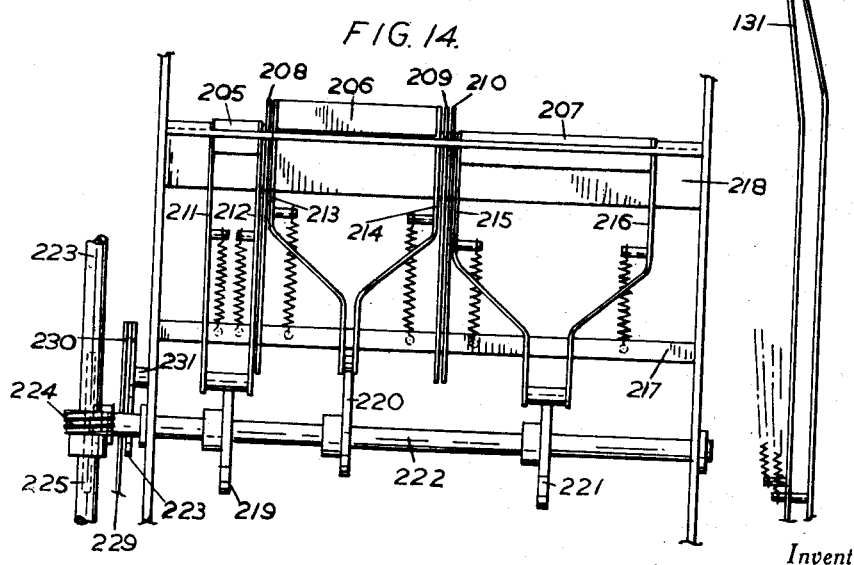
*Inventor*
ARTHUR WILLIAM EXCELL
By *JL L Sterling*
*Attorney*

Nov. 17, 1953 A. W. EXCELL 2,659,302
RECORD CARD CONTROLLED SENSING AND PRINTING MEANS
Filed Aug. 22, 1950 14 Sheets-Sheet 11
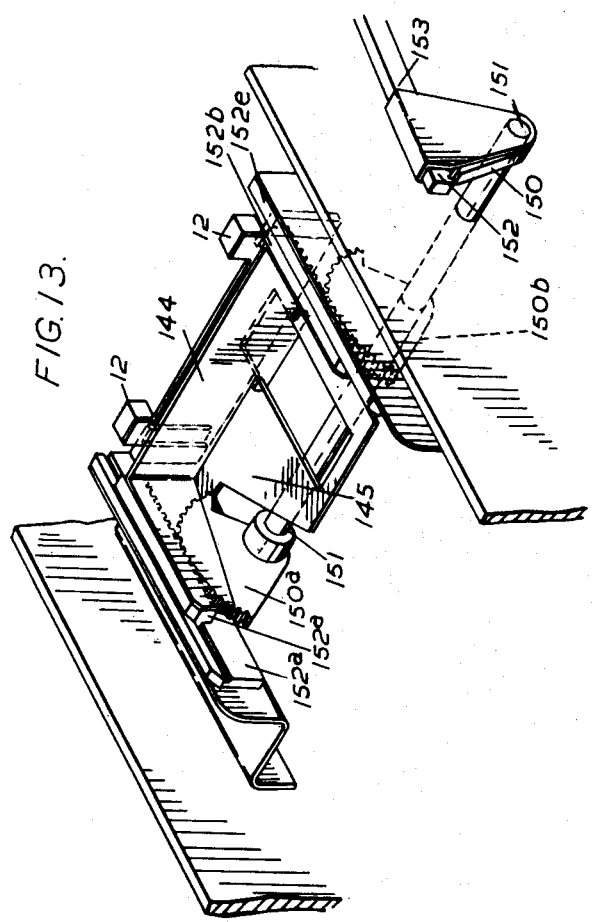
Inventor
ARTHUR WILLIAM EXCELL
By *JL L Sterling*
Attorney Nov. 17, 1953  A. W. EXCELL  2,659,302
RECORD CARD CONTROLLED SENSING AND PRINTING MEANS
Filed Aug. 22, 1950  14 Sheets-Sheet 12

Inventor
ARTHUR WILLIAM EXCELL

By
Attorney

Nov. 17, 1953  A. W. EXCELL  2,659,302
RECORD CARD CONTROLLED SENSING AND PRINTING MEANS
Filed Aug. 22, 1950  14 Sheets-Sheet 13

Inventor
ARTHUR WILLIAM EXCELL

By *JL L Sterling*
Attorney

Nov. 17, 1953 A. W. EXCELL 2,659,302
RECORD CARD CONTROLLED SENSING AND PRINTING MEANS
Filed Aug. 22, 1950 14 Sheets-Sheet 14

Inventor
ARTHUR WILLIAM EXCELL

By *J. L. Sterling*
Attorney

Patented Nov. 17, 1953

2,659,302

UNITED STATES PATENT OFFICE 2,659,302

RECORD CARD CONTROLLED SENSING AND PRINTING MEANS

Arthur William Excell, Thornton Heath, England, assignor to Powers-Samas Accounting Machines Limited, London, England, a British company Application August 22, 1950, Serial No. 180,728

Claims priority, application Great Britain September 5, 1949

16 Claims. (Cl. 101—93)

This invention relates to machines for printing on statistical record cards.

It is sometimes desired to print on a record card such information as a name and address together with certain other data such as a statement of a balance standing on a mortgage or other account and heretofore this has usually been accomplished by manually operated posting machines.

It is a main object of the present invention to provide a record card controlled machine which during a single passage of a card through the machine will print in a plurality of horizontal lines on the card information obtained by sensing one or more record cards, such information consisting, for example, of a name and address and data such as a statement.

With this object in view it is, according to one aspect of the invention, proposed to sense data from two associated cards one of which has perforated therein the data comprising the statement and an identification reference number, the other having perforated therein the name and address to be associated with the statement together with the same identification reference number, the combined data being printed on the card bearing the perforations representing the statement. By this means the card having the name and address perforated therein can be employed as a stock card for use whenever it is desired to associate a statement therewith.

To distinguish a record card from a card to be printed on, a record card having the name and address perforated therein will hereinafter be referred to as a "stock card" and this term is to be understood as also including a record card bearing all the information to be printed on a different card whether or not the information contains a name and address or whether it contains other data to be printed on said different card.

Further, for the purposes of distinction herein, a card to be printed on, whether or not it also has data perforated therein, will be hereinafter referred to as a "posting card."

According to the invention a method of posting information on a card consists of the steps of feeding posting and stock cards in succession through a machine provided with a sensing means and printing mechanism, retaining the posting card in printing position for a plurality of consecutive cycles of the machine, retaining the stock card in sensing position for a plurality of consecutive cycles of the machine and sensing a different field or fields of the card during each cycle, transmitting the data sensed during each cycle to the printing mechanism and printing the data on the posting card, and advancing the posting card to a new line printing position during each sensing of the stock card, whereby data sensed during consecutive cycles while the stock card is in sensing position is printed in different line positions on the posting card during the single passage of the posting card through the machine.

Further, a machine for printing on a card comprises sensing means and printing mechanism, means to feed posting and stock cards in succession through the machine, means to retain a posting card in printing position for a plurality of consecutive cycles of the machine, means to retain a stock card in sensing position for a plurality of consecutive cycles of the machine, means to control the sensing means so that sensing of a different field or fields is or are effected during each cycle, means to transmit data sensed during each cycle to the printing mechanism, means to effect operation of the printing mechanism after transmission of said data thereto, and means to advance the posting card to a new line printing position during each sensing of the stock card, whereby data sensed during consecutive cycles while the stock card is in sensing position is printed in different line positions on the posting card during the single passage of the card through the machine.

Still further according to the invention a machine for printing on cards comprises sensing means to sense data recorded on a record card, printing mechanism operable in timed relation with the sensing means and including type elements and associated hammer mechanisms to print an impression on a record card, transmission elements operable by the sensing means to effect setting of the type elements in accordance with the data sensed from a record card, means to feed a posting card and a stock card in succession to the sensing means, means to arrest each card in a position for sensing by the sensing means and to retain the stock card in sensing position for a plurality of sensing operations effected during consecutive machine cycles, means to determine the card field sensed during each cycle, and stop means operable in timed relation with the sensing means to locate the posting card in successive line printing positions with respect to the type elements, whereby data sensed from the posting card is printed in one line thereon and data sensed from the stock card during successive sensing operations effected on the stock card is printed in successive line positions on the posting card during a single passage of the posting card through the machine.

Also according to the invention a machine for printing on cards comprises a positively rotated main shaft, an auxiliary shaft driven by the main shaft through reduction gearing so that the main shaft makes a predetermined number of revolutions for each revolution of the auxiliary shaft, sensing means operable by the main shaft to sense data recorded on a record card, printing mechanism operable in timed relation with the sensing means and including type elements and associated hammer mechanism to print an impression on a record card, transmission elements operable by the sensing means to effect setting of the type elements in accordance with the data sensed from a record card, means to feed a posting card and a stock card in succession to the sensing means, means to arrest each card in a position for sensing by the sensing means and to retain a stock card in sensing position for a plurality of sensing operations effected during consecutive cycles of the main shaft, means operable by the auxiliary shaft to determine the card field or fields sensed during each cycle of the main shaft, and stop means operable in timed relation with the main and auxiliary shafts to locate the posting card in successive line printing positions with respect to the type elements, whereby data sensed from the posting card is printed in one line thereon and data sensed from different fields of the stock card during successive sensing operations effected in respect thereof is printed in successive line positions on the posting card during a single passage of the posting card through the machine.

Figures 6, 7:
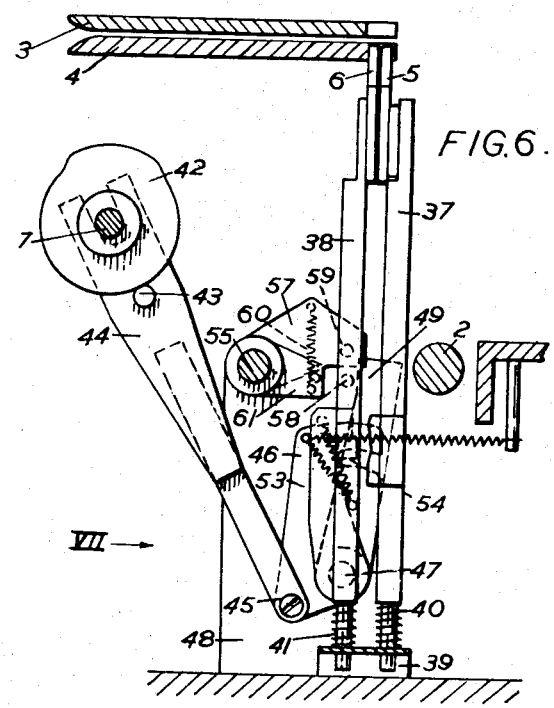
Figure 8:
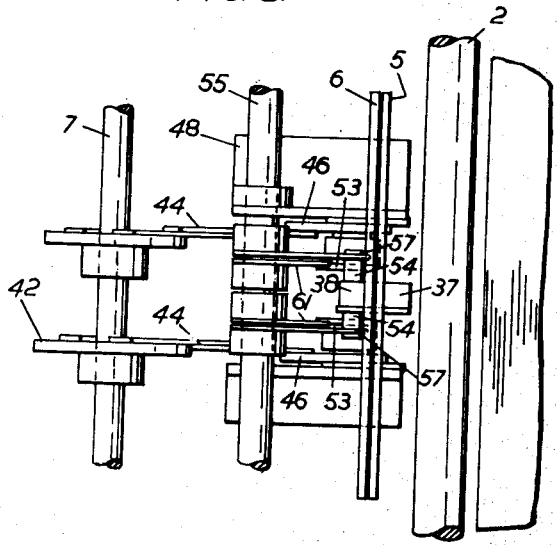
Figure 12:
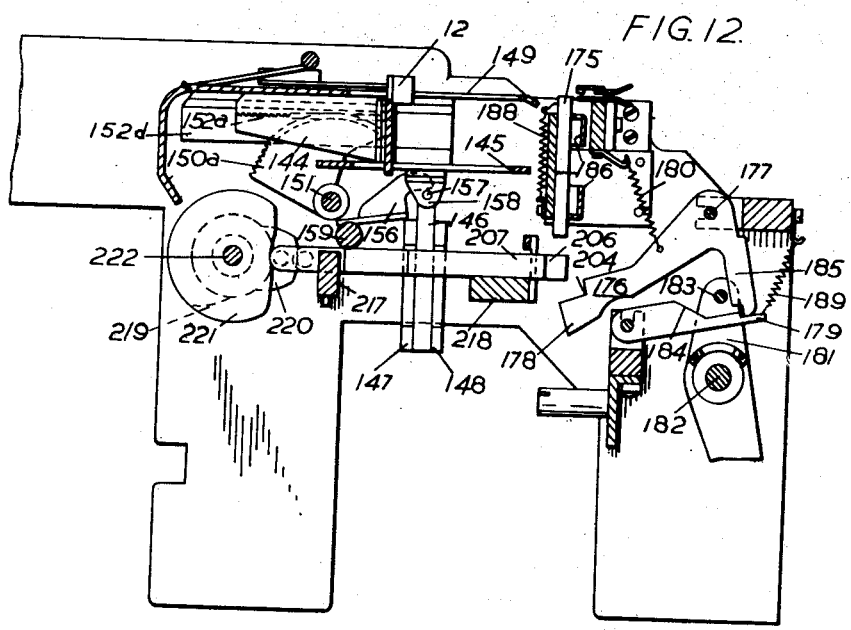
Figure 17:
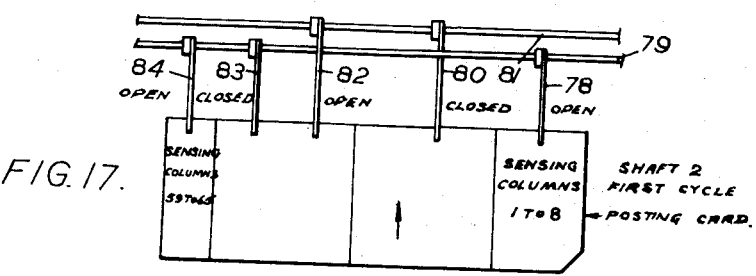
Figure 20:
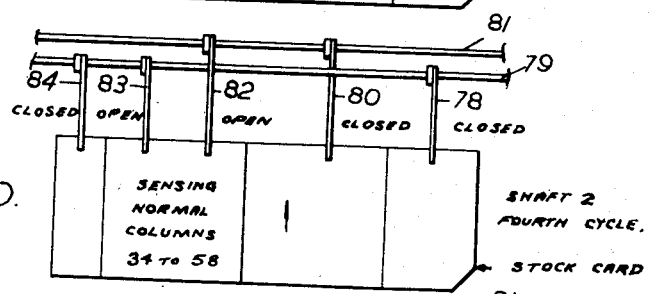
Figure 21:
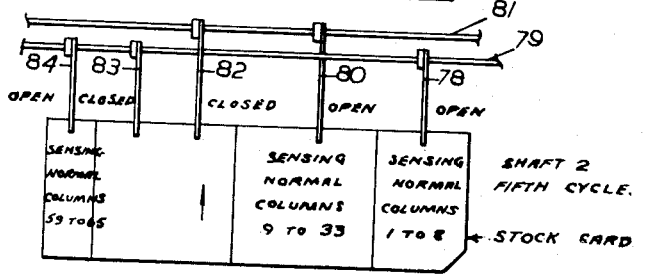
Figure 22:
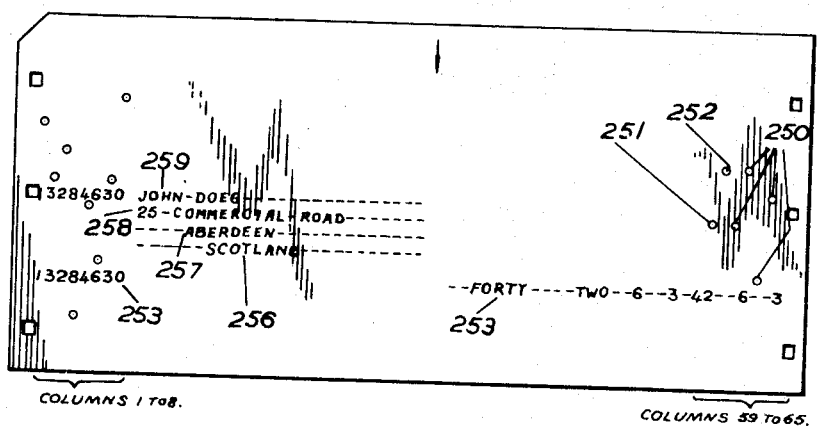
Figure 23:
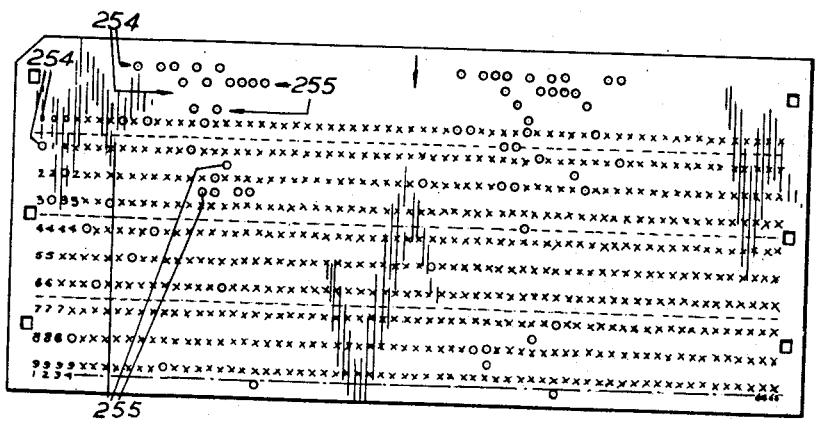

In order that the invention may be more clearly understood an embodiment thereof will be described by way of example with reference to the accompanying diagrammatic drawings in which:

Figures 1A, 1B and 1C together show the machine in outside elevation,

Figure 2 is a diagram showing the arrangement of Figures 1A, 1B and 1C,

Figures 3A, 3B and 3C together show the machine in outside elevation partly in section viewed from the side opposite from that seen in Figures 1A, 1B and 1C, Figure 4 is a diagram showing the arrangement of Figures 3A, 3B and 3C, Figure 5 is a section through the machine and shows a card sensing mechanism, card stop mechanism therewith, and the type setting mechanism, Figure 6 is a view, to an enlarged scale, of the card stop mechanism shown in Figure 5, Figure 7 is a view of the card stop mechanism looking in the direction of the arrow VII, Figure 6, Figure 8 is a plan of Figure 5 with the sensing and printing mechanism omitted, Figure 9 is an end view of shutter mechanism associated with the sensing mechanism, Figure 10 is a section on line X—X, Figure 5, showing the arrangement of the shutters, Figure 11 is a scrap view showing the control cams for the card stops and shutters, Figure 12 is a section through the print hammer control mechanism and showing the card stop for locating a posting card in successive printing positions, Figure 13 is a perspective view of the part of the mechanism for operating the card stop shown in Figure 12, Figure 14 is a plan of hammer cut-out mechanism, Figure 15 shows the mechanism for driving the hammer mechanism, Figure 16 is a scrap view showing rack cut-out mechanism, Figures 17 to 21 diagrammatically illustrate the positions of the shutters associated with the sensing mechanism during successive cycles of operation, Figure 22 diagrammatically illustrates a posting card printed on by the machine, and Figure 23 shows a stock card provided with perforations representing the data printed on the posting card shown in Figure 22.

Figure 24:
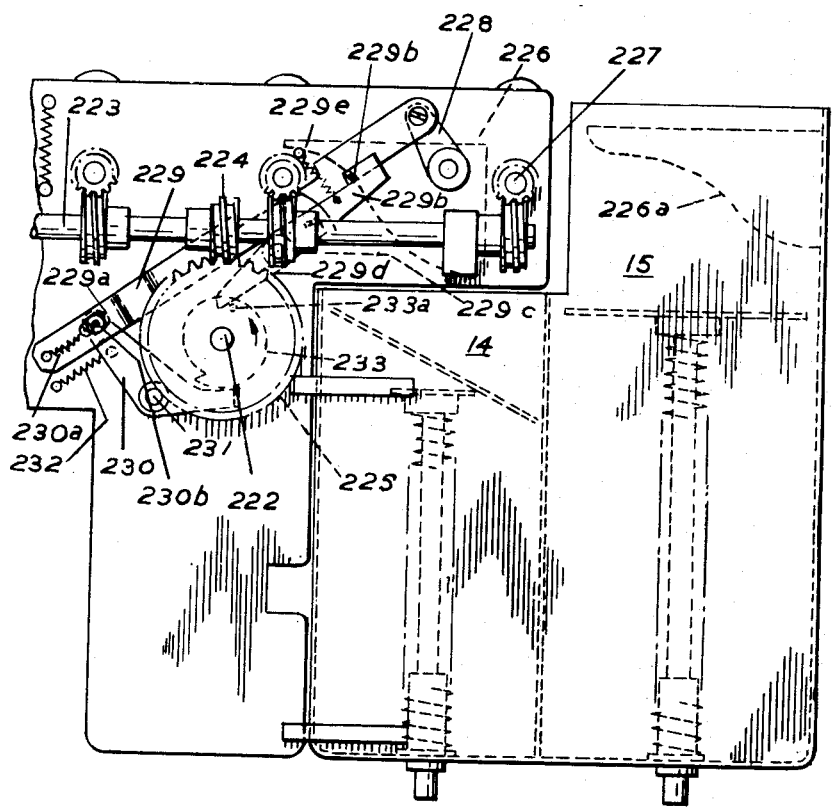

Figure 24 is a view similar to that of Figure 1C but shows an alternative form of receiver mechanism whereby posting and stock cards are delivered to receivers in the reverse order from that in which they are delivered by the mechanism shown in Figure 1C.

Referring to the drawings, the machine illustrated in Figures 1A, 1B and 1C, and in Figures 3A, 3B and 3C respectively is, in general, similar to that shown in Figures 1 and 2 respectively of British patent specification No. 478,597 but, as hereinafter described, contains modifications permitting the present invention to be carried into effect. The machine comprises a magazine 1, Figures 1B and 3B, in which is placed a stack or pile of cards containing alternate posting cards and stock cards so that a posting card is fed from the magazine in precedence to a stock card. As will hereinafter appear in the machine about to be described one posting card and its associated stock card is fed from the magazine during five successive cycles of the main shaft 2 of the machine and to avoid card feeding at each cycle of the main shaft means hereinafter described are provided to prevent cards being fed from the magazine except during predetermined cycles of the main shaft.

Cards fed from the magazine are delivered to a sensing chamber comprising fixed pin plates 3 and 4, Figure 5, between which the cards are fed. The posting card is retained in the chamber for one cycle only of the main shaft while the stock card is retained therein for four cycles of the main shaft. The cards are retained in the sensing chamber by card stops 5 and 6, described below, the card stops being operated from an auxiliary shaft 7 driven from the main shaft 2 by a compound train of reduction gearing 8, 9, 10 and 11, Figure 3B, in the ratio of 5:1. This auxiliary shaft 7 also controls other operations of the machine as will be described below.

The posting card is arrested in sensing position by the card stop 5 and on being released by the stop 5 is fed to a printing position at which it is controlled by a further card stop comprising two blocks 12, Figures 12 and 13, while receiving a succession of printed impressions from type wheels 13, Figures 1B, 3B and 5. During each fifth cycle of the main shaft the posting card is released from printing position and the stock card from the sensing chamber and both cards are delivered to card receivers 14 and 15, Figure 3C or Figure 24 as hereinafter described, so that the cards which were alternately disposed in the pile in the magazine 1 are delivered from the machine as two sorted packs containing posting and stock cards respectively.

*Card feeding and sensing mechanism*

The cards are fed from the magazine 1 by means of a picker 16, Figure 3B, and feed rolls 17, the picker 16 being formed with two depending lugs 18 one at each side and these lugs are connected by a shaft 19 of which the ends project through slots 20 in the side of frame 21 of the machine. Outside the frame at its left-hand side, that is as viewed in Figure 3B, the shaft 19 is pivoted to a picker supporting arm 22 which is fixed on a spindle 23. Operation of the picker 16 is effected by an eccentric strap 24 of which eccentric 25 is secured to the main shaft 2.

To avoid feeding cards except on the first and second cycles of a succession of five cycles of the main shaft 2, connection between the arm 22 and eccentric strap 24 is effected by a connecting arm 26 free on the spindle 23 and to which the eccentric strap 24 is connected. The arm 26 is connected by a spring 27 to a further connecting arm 28 fixed to spindle 23 and provided with an abutment, shown as a lateral pin 29. A cam 30, Figure 1B, is secured to the auxiliary shaft 7 and co-operates with a roller 31 on a bell crank 32 pivoted about a spindle 33 mounted in a bracket 34 fixed to the side of the machine frame. A nose 35 is formed on the bell crank 32 and acts as a latch to engage an abutment shown as a pin 36 extending laterally from an arm 22a also mounted on the spindle 23. When the bell crank 32 is in the position shown in Figure 1B the nose 35 engages the pin 36 and prevents the picker 16 from making its full backward stroke. Accordingly the picker does not become engaged behind the bottom card contained in the magazine and thus whilst being governed by the nose 35 prevents the feeding of cards from the magazine. During this restrained movement of the arms 22, 22a the spring 27 is extended and the arm 26 is moved away from the pin 29. The cam 30 controls the movement of the bell crank 32 and permits free reciprocation of the arms 22, 22a only during the first two successive cycles of a series of five cycles.

The card is delivered by the rollers 17 and succeeding pairs of similar rollers between the fixed pin plates 3 and 4, the cards on being moved into the sensing chamber being arrested by the card stop 5 or card gate or 6 as hereinafter described. The card stops 5 and 6 are fixed to the upper ends of square pillars 37 and 38 respectively, Figures 5 and 6, each pillar being guided at its lower end in a bracket 39 and the pillars being urged in an upward direction by springs 40, 41 respectively.

The card stops are controlled by two cams 42 only one of which is shown in Figure 6 the cams being mounted for rotation with the auxiliary shaft 7. Each cam co-operates with a roller 43 carried on a link 44 pivotally connected at 45 to a guide plate 46 pivoted at 47 to a bracket 48. A latch 49 is pivoted at 47 and is connected with the plate 46 by a spring 50, Figure 7, the end of the spring 50 which is connected to the latch 49 being anchored to a spring post 51 which also serves as an anchorage for a spring 52 connecting the latch 49 with a latch 53. To each of the pillars 37 and 38 is secured a square pin 54 over which the latch 53 engages. As the cam 42 rocks the plate 46 in a counter-clockwise direction the latch 53 is released from the square pin 54 and the card stop associated therewith is urged upwards to card arresting position by the spring 40 or 41, as appropriate. To open the card stop after it has been moved to card arresting position there is provided a subsidiary shaft 55, Figures 1B, 5 and 6, supported in bracket 48, the shaft being rocked in a clockwise direction, as viewed in Figures 5 and 6, by a cam 56 mounted on the main shaft 2, see Figure 1B. A lever 57, Figure 6, mounted on auxiliary shaft 55 is moved downwards by the shaft and depresses a pin 58 projecting laterally from the pillars 37 or 38 thus urging the pillar downwards against its spring and withdrawing the card stop from card arresting position. The latch 53 is then again engaged over the square pin 54.

As will hereinafter appear the card stops 5 and 6 are so operated during five successive cycles of the main shaft 2 that the stop 5 is raised and restored during the first cycle, the stop 6 is raised during the second cycle and is restored towards the end of the third cycle, and the stop 5 is again raised during the fourth cycle and restored towards the end of the fifth cycle. It is, therefore, required that the lever 57 does not restore a card stop at each cycle as would normally occur due to the restoring cam 56 being provided on the main shaft 2, and restoration of a stop when not required is prevented by the latch 49 which, when the latch 53 has been moved out of engagement with the square pin 54, is moved into position beneath a pin 59, Figure 6, on the lever 57. The lever 57 is freely mounted on the auxiliary spindle 55 but is connected by a spring 60 to an arm 61 which is secured to the spindle 55.

The restoring cam 56 is provided with two humps 62 and 63, Figure 1B, of which the hump 63 is adapted to restore the card stops when a stock card is in the sensing chamber, while the hump 62 is adapted to restore the card stop when a posting card is in the card chamber so as to release the posting card to permit it to be moved to printing position. The two humps are necessary because the posting card leaves the sensing chamber at a different time in the first cycle from that at which the stock card leaves the sensing chamber during the fifth cycle, as will hereinafter appear. The cam 56 operates the spindle 55 through an arm 64 secured to the spindle and carrying at its free end a cam follower 65.

The sensing mechanism comprises a pin box 66 which is fully described in United Kingdom patent specification No. 401,012 and is shown diagrammatically in Figure 5. It comprises a plurality of columns of sensing pins 67 guided in upper and lower frame plates 68. Surrounding each pin is a coil spring 69 of which one end bears against a collar on the pin and the other end bears against the upper plate 68.

The pin box is reciprocated as described in the aforesaid specification No. 478,597 and beneath the sensing pins 67 are the plates 3 and 4 between which the cards are fed and arrested by the card stops 5, 6 above described.

Mounted above the sensing pins 67 is a pair of stationary perforated plates 70 which act as guides to a plurality of transmission elements shown as rods 71 there being one rod 71 for each sensing pin as described in the aforesaid specification No. 401,012. Each of these rods is spring pressed downwardly.

Disposed between the lower ends of the rods 71 and the upper ends of the pins 67 is a fixed plate 72 having rectangular perforations formed therein and carrying a plurality of connecting elements 73 each having a head and shank portion as described in the aforesaid specification No. 401,012.

In operation the lower part of the pin box 66 comprising the plates 68 and the sensing pins 67, as described in specification No. 478,597, is reciprocated while the upper portion including the plates 70 and 72 remain stationary.

Between the plate 72 and the upper ends of the sensing pins is a plurality of disabling devices provided selectively to disable a predetermined group or groups of columns of sensing pins 67 during consecutive cycles of the main shaft 2. The disabling devices comprise four slotted shutter plates 74, 75, 76 and 77, Figure 10. The shutters are mounted for independent operation and are operated, in a manner similar to that described in United Kingdom specification No. 518,752, to permit the sensing pins 67 to sense consecutively a plurality of groups of hole positions in each of a plurality of parallel groups of vertical columns of index positions on a record card. The arrangement of the shutters is shown more clearly in Figures 9 and 10 taken in combination with Figure 5.

The sensing pin box 66, Figures 1B and 5, has, in the construction being described, sixty-five columns of sensing pins 67 and the shutter plate 74 controls one section of the pin box comprising columns one to eight, shutter 75 controls columns nine to thirty-three, shutter 76 controls columns thirty-four to fifty-eight, and shutter 77 controls columns fifty-nine to sixty-five. The shutter 74 is provided with a latch 78 mounted on a control shaft 79, shutter 75 is provided with a latch 80 mounted on a control shaft 81, shutter 76 is provided with two latches 82 and 83 of which the latch 82 is mounted on shaft 81 and the latch 83 is mounted on shaft 79, and shutter 77 is provided with a latch 84 mounted on shaft 79. The control shafts 79 and 81 are mounted in brackets 85, Figures 1B and 3B, secured to the machine frame, an arm 86 being secured to one end of the shaft 81, see Figure 3B, while a corresponding arm 87 is secured to one end of the shaft 79. A link 88 is slotted to engage a pin 89 carried by arm 86 and at its opposite end carries a roller 90, Figure 11, which engages a cam 91 secured to shaft 7, being retained in engagement with the cam by a spring 92, Figure 3B. A second link 93 is connected to the arm 87 by a slot and pin connection as described above with reference to the link 88, and at its opposite end carries a cam roller 94 engaging a cam 95 also on shaft 7. A spring 96 maintains engagement between cam 95 and roller 94. The links 83 and 93 are connected by springs 97 and 97a to the pins 89 and 89a in their respective levers 86 and 87.

The shutters 74 and 77 are each provided with a control arm 98, Figure 5, secured to a shaft 99 and the shutters 75 and 76 which are wider than the shutters 74 and 77 are each provided with two arms 98 also mounted on the shaft 99. The control arms 98 co-operate with slots 100, Figure 10, to move the shutters against the action of springs 101 each time the shaft 99 is rocked.

When one of the shutters is moved against the action of its spring 101, slots, not shown, formed in the shutter as described in the aforesaid specification No. 518,752, hold the corresponding connecting elements 73 preventing them from swinging in a clockwise direction, as viewed in Figure 5, about their heads under the action of the springs associated with the transmission rods 71. If, however, the shutter is moved in the opposite direction then the slots in the shutter permit the connecting elements 73 to swing in a clockwise direction, the action of these connecting elements being the same as the action of the similar elements described in the aforesaid specification No. 401,012. Thus, if a shutter is held against the action of its spring 101 then the corresponding columns of connection elements 73 cannot operate and the corresponding section of the pin box 66 is rendered inoperative. As is described in specification No. 518,752 the shaft 99 is rocked in a counter-clockwise direction, as viewed in Figure 5, when the pin box is at the bottom of its stroke thus tending to move each of the shutters 74, 75, 76 and 77 against their springs 101. During the greater part of the revolution of the main shaft 2, however, the shaft 99 is at the end of its travel in the clockwise direction so that each of the shutters, if free, will be moved to the left, Figure 5, by their springs 101.

The cams 91 and 95, however, operate during selected cycles of the main shaft 2 to actuate the latches 78, 80, 82, 83 and 84 so that, as will be described below, one or more of the shutters is locked in its pulled position while the remaining shutter or shutters is or are free to move. As can be seen from Figures 5 and 10, the latches are provided with hook members which engage in square holes 102 formed in extension pieces 103 secured to the shutters for movement therewith, and the operation of the shutters is similar to that of the shutters described in the aforesaid specification No. 518,752. In order that the latches may be snapped into and out of the square holes 102 in extension pieces 103 the latches engage the upper or undersides of the extension pieces, as the case may be, before entering the square holes. This action is accommodated by the slots in the links 88, 93 sliding over the pins 89 and 89a, Figure 3B, associated therewith thus permitting the latches to rest against the faces of the extension pieces. When the links 88 and 93 have made their full movement, the shaft 99 is rocked and the springs 97 or 97A permit the latches to snap into the square holes 102. The lost motion during this movement is taken up by the springs 97 and 97A.

As mentioned above, the shutters operate in a predetermined sequence, the cams 91 and 95 being profiled to obtain the desired sequence. During the first cycle of the main shaft 2 a posting card is in sensing position and the fields included in columns one to eight and fifty-nine to sixty-five of the card, see Figure 21, are to be sensed. In this instance, when the shaft 99 is rocked the shutters are all moved to the right as viewed in Figure 5. The cams 95, 91 then simultaneously rock shafts 79 and 81 so that the upper latches 78, 82 and 84 are moved out of their square holes 102 while the latches 80 and 83 engage their associated square holes 102. When the arms 98 are returned to starting position the shutters 74 and 77 are free to return under the influence of their associated springs 101 while the shutters 75 and 76 are retained in the pulled position by the latches 80 and 83. Thus, the sensing of columns one to eight and fifty-nine to sixty-five of the posting card is effected and is transmitted to the printing mechanism as described below.

During the second cycle of main shaft 2 the stock card is in the sensing position and is arrested therein by the card stop 6 in a position which will be referred to as the inter-stage position, that is a position at which sensing can be effected of perforations formed in horizontal rows 255 in the card between the normal horizontal rows 254 of the card, see Figure 23. In this, the second, cycle the cams 91, 95 operate so that the latches 82 and 83 are open while latches 78, 80 and 84 are closed thereby permitting sensing of the inter-stage positions in columns thirty-four to fifty-eight of the stock card.

In the third cycle of the shaft 2 the card is still arrested by the stop 6 but cams 91, 95 operate to open the latches 80 and 83 to permit sensing of the stock card in columns nine to thirty-three, latches 78, 82 and 84 being closed.

During the fourth cycle of main shaft 2 the stock card is advanced slightly into the sensing chamber to be arrested by the card stop 5 to permit sensing of the normal horizontal rows 254 of the card and in this, the fourth, cycle the latches 82 and 83 are both open thus freeing the shutter 76 and permitting the sensing of columns thirty-four to fifty-eight, the shutters 74, 75 and 77 being in the latched positions.

In the fifth cycle of the main shaft 2 the latches 78, 80 and 84 are open thus permitting sensing of the normal horizontal rows of the card in columns one to thirty-three and fifty-nine to sixty-five, the shutter 76 being latched by both of the latches 82 and 83.

*Type setting mechanism*

The type wheels 13 are set by mechanism similar to that described in the aforesaid specification No. 478,597 but as the mechanism differs in some respects to that described in the aforesaid specification it will be briefly described herein.

Referring to Figure 5, there is disposed above the pin box 66 a connection box containing a plurality of connection wires 104 of which the lower ends are in register with the corresponding transmission rods 71 while the upper ends register with corresponding stops 105 in a stop basket 106. Each stop 105 is normally held down by a spring 107.

There are twelve stops in each column, of which the two lefthand stops 105a and 105b represent the letters A and B respectively.

Mounted in a frame 108, Figures 1A and 3A, disposed above the stop basket 106 is a plurality of type setting slides 109, one for each column of stops 105. The operation of these slides is as described in specification No. 478,597, but means to be described below are provided for preventing actuation of selected groups of slides when these slides are not required for operation. The slides 109 have teeth thereon to operate two sectors 110 engaging gear wheels 111 which drive further gear wheels 112 which, in turn, drive the type wheels 13.

To prevent the slides 109 from moving forward in those columns in which sensing is not effected during a cycle of the main shaft 2, stops 114 and 115, Figures 5 and 16, are provided to prevent the forward movement of the slides associated with columns nine to thirty-four and thirty-seven to sixty-five respectively. The stop 114 is mounted between two arms 116 and 117 which are pivoted to short levers 118 and 119 fixed to a tubular shaft 120 mounted in bearings 121, 122 and 123.

The stop 115 is supported by two arms 124 and 125 pivoted to short levers 126 and 127 mounted on a spindle 128 which passes through the tubular shaft 120. Secured to one end of the tubular shaft 120 is a short arm 129, Figure 1A, and a similar short arm 130 is secured to the end of the spindle 128. A link 131 is secured to the arm 129 and a similar link 132 is secured to the short arm 130. The other ends of the links 131 and 132 carry cam rollers 133 and 134, Figure 1B, respectively engaging cams 135 and 136 on the auxiliary shaft 7. The cams 135 and 136 thus operate in timed relation with the cams 91 and 95 and move the stops 114, 115 associated therewith into or out of engagement with slots 137, Figure 5, formed in the slides 109. Thus when the shutter 75 is latched, as described above, the stop 114 engages the slots 137 in the slides 109 associated with columns nine to thirty-three, preventing the slides so engaged from moving forward. Similarly when the shutter 76 is in latched position the stop 115 prevents the slides 109 associated with columns thirty-seven to sixty-five from moving forward.

When the machine is empty and no card is in the sensing pin box 66 the shutters 74, 75, 76 and 77 are prevented from moving in a manner similar to that described in specification No. 401,012. If none of the pins 71 is raised then all the slides 109 will run forward to the fixed stop 138, Figure 5. To prevent this action two latches 139, Figures 1A, 3A, and 5, of which only one is shown, are fixed to a cross shaft 140 and engage with pins 141 on arms 142 which as described in specification No. 478,597 operate a control bar 143 normally retaining the slides in their rearward position as shown in Figures 1A, 3 and 5.

*Print hammer mechanism*

The posting card when it has been fed from the sensing chamber is passed by feed rollers to the printing position in which it is located beneath the type wheels 13, being retained in desired horizontal line printing position by the card stop blocks 12. The card stop 12 is mounted on a U-shaped frame 144, Figures 12 and 13, resting on a plate 145 supported by stems 146 for vertical reciprocation between guides 147, 148. The frame 144 is slidable on the plate 145 and a guide plate 149 over which the cards pass is provided with slots through which the card stop block of a card gate 12 can pass. In Figure 12, the stops 12 are shown in card arresting position in which they project above the card guide plate 149. The stop blocks 12 are moved stepwise away from the type wheels, that is to the left of Figure 12, during the second, third, fourth and fifth cycles of the main shaft 2 so that the posting card is successively positioned in spaced horizontal line relation to receive impressions from the type wheels. To effect the movement of the stop blocks 12 to these various card arresting positions there are provided three quadrants 150, 150a, 150b mounted on a shaft 151. The quadrant 150, Figure 3C, meshes with a rack 152 riveted to a link 153 the opposite end of which carries a cam roller 154 for operation by a cam 155 on the auxiliary shaft 7. The quadrants 150a and 150b, Figures 12 and 13, are pinned to the shaft 151 between the side frames of the machine and mesh with racks 152a and 152b, Figure 13, secured to the sides of the card stop frame 144, the racks 152a and 152b being slidable in guides 152d and 152e secured to brackets mounted on the side frames of the machine. As the cam 155 is rotated, the stop blocks 12, through quadrants 150, 150a, and 150b and racks 152a and 152b are intermittently moved to their successive card arresting positions.

The stop blocks 12 are moved into and out of the card arresting position shown in Figure 12 by two members 156 which engage pins 157 mounted in brackets 158 secured to the under surface of the plate 145. The members 156 depress the stems 146 against the action of a spring, not shown, which spring urges the stop to the card arresting position shown in Figure 12. The two members 156 are supported for angular movement by a rocking shaft 159 to which shaft is connected a short arm 160, Figure 3C, the other end of which is pivoted to an actuating link 161, Figures 3B and 3C. The other end of the actuating link 161 is adapted for engagement with an abutment 162 extending laterally from a plate 163 guided for lengthwise movement by fixed spindle 164, and a hammer control shaft 182. The plate 163 carries a cam roller 166 which is engaged by a cam 167 on the main shaft 2.

When a posting card is in printing position the stop blocks 12 are retained in the card arresting position for five successive cycles of the main shaft 2 and to ensure that the stop blocks are not withdrawn by the cam 167 on the main shaft 2 a trip link 168 is connected at one end to the actuating link 161 and at its other end to one arm of a bell crank 169 pivoted at 170 to the machine frame. The other arm 171 of the bell crank has connected thereto a link 172 the opposite end of which carries a cam roller 173, see Figure 11, the roller 173 being actuated by a cam 174 on the auxiliary shaft 7. The cam 174 is adapted to rock the arm 169 of the bell crank in a counterclockwise direction so that the actuating link 161 is lowered out of the path of the abutment 162 so that, until the actuating link 161 is restored to the position shown in Figure 3B, the card stop blocks 12 remain in the raised position.

Printing is effected by transmission rods 175, Figure 12, actuated by hammers 176. The hammers are each pivotally mounted on a spindle 177 each hammer comprising a bell crank as shown in the drawing. The longer arm of the bell crank carries a hammer head 178 the shorter arm normally engages a latch 179 holding the hammer back against the action of a spring 180.

Carried between arms 181 on a hammer control shaft 182 is a bail 183 which, when the control shaft 182 is rocked as described below, engages cam surface 184 on all the latches 179 and swings the latches out of engagement with the arms 185 of the bell cranks, whereupon the springs 180 cause the heads 178 smartly to strike a corresponding number of transmission rods 175 which, as shown in the drawings, are mounted in guides 186. Each transmission rod 175 is in register with a type on the corresponding type wheel 13 and serves to transmit the hammer blow through an inked ribbon 187, Figure 3B, and a posting card located in line printing position by the stop blocks 12, so that an impression is produced on the card. Each transmission rod 175 is fitted with a return spring 188 which is slightly heavier than the spring 180 on the corresponding hammer. The transmission rod 175 is moved by the energy of the hammer due to the swing but returns immediately from contact with the card.

When the hammer latch 179 is released, the hammer head 178 flies upwards under the influence of the spring 180 and the momentum causes it to drive its associated transmission rod 175 upwards. Immediately, however, the hammer movement is arrested the transmission rod 175 is lowered again as the spring 188 is stronger than spring 180.

As the hammer control shaft 182 rocks back again, the bail 183 restores the hammers which are then re-engaged by the latches 179 under the action of springs 189 connected to the latter.

Actuation of the control shaft 182 is obtained from the main shaft 2 to which is secured an eccentric 190, Figures 3B and 15, of which the eccentric strap 191 is provided at its end with a slot 192 to engage a pin 193 carried by an arm 194 secured to the hammer control shaft 182.

Mounted on the pin 193 is a plate 195 which is guided at its other end by a slot 136 through which the main control shaft 2 passes.

Pivoted to the eccentric strap 191 at 197 is a latch 198 which has a nose 199 and is connected by a link 200 to a lever 201 which lever rocks the shaft 99, Figures 3B and 5, to actuate the shutters 74, 75, 76, and 77 against the action of the springs 101.

The plate 195 is formed with a shoulder 202 and a spring 203 is provided which tends to pull the pin 193 to the left in Figure 15.

Normally the parts are in the position shown in Figure 15 and, when a card in the sensing chamber is sensed, the lever 201 is permitted to rock clockwise in Figure 15. Consequently, link 200 permits the latch 198 to rock about its pivot 197 until its nose 199 engages with the shoulder 202 on the plate 195. Hence the movement of the eccentric strap 191 to the right in Figure 15 carries the latch 198 also to the right and takes with it the plate 195 since the shoulder 202 is engaged by the nose 199. This movement rocks the hammer control shaft 182 and releases the hammers as described above.

When a type wheel is not set as a result of a sensing operation a card is normally printed with a horizontal dash and, as certain columns of a card are always blocked off from a sensing operation, the type wheels not set during the sensing operation would, as just mentioned, operate to print a series of dashes on a card in those columns in which sensing is not effected. To prevent the printing of dashes when these are not required there is provided mechanism now to be described.

Each hammer head 178 is provided with a notch 204, Figure 12, and three latches 205, 206 and 207, Figures 12 and 14, are provided to cooperate with the notches 204. The latch 205 is to control the hammers for printing in card columns one to eight, latch 206 is to control hammers for printing in card columns ten to thirty-four, and latch 207 is to control the hammers for printing in card columns thirty-seven to sixty-five. Fixed latches 208, 209 and 210 are provided permanently to cut out the hammers associated with card columns nine, thirty-five and thirty-six.

The latch 205 is supported by a pair of arms 211, 212, while the latch 206 is supported by arms 213 and 214, and the latch 207 is supported by arms 215 and 216. The supporting arms are all guided for lengthwise movement in combs 217, 218, Figure 12. The latches are independently operated by cams 219, 220 and 221 secured to a shaft 222 driven by a stub shaft 223, Figure 14, through gears 224, 225. The stub shaft 223 is driven from the driving shaft 2a, Figure 1B, by gearing not shown, and the cams 219, 220 and 221 are timed to operate the latches 205, 206 and 207 in accordance with the movements of the shutters 74, 75, 76, and 77 so that the latches 205, 206 and 207 are effective to prevent firing of the hammers of the selected groups at those times when the shutters associated therewith prevent sensing of the card fields controlled thereby.

Card sorting mechanism and machine controls

As mentioned above, when the posting card has been provided with printing in five horizontal lines the card is released by the stop blocks 12 and the feeding rollers deliver the card into a card receiver 14 or 15. Just prior to the posting card being released by the stop blocks 12 the card stop 5 associated with the sensing mechanism releases the stock card so that this card is also moved through the machine by the feeding rollers and is delivered into a card receiver 14 or 15. The stock card is not arrested in the printing position and the timing of the machine during the fifth cycle of the main shaft 2 is such that the stock card has nearly overtaken the posting card either when the posting card is delivered into the receiver 14 or when the stock card is delivered into the receiver 14 and the posting card is delivered into the receiver 15.

When the posting card is to be delivered into the receiver 14 and the stock card into the receiver 15, to ensure that the stock card passes over the receiver 14 and is received into the receiver 15 a shutter 226, Figure 1C, is carried by a spindle 227 to one end of which is secured a short arm 228. The arm 228 is rocked by a link 229 one end of which is connected to the arm 228 the other being connected to a bell crank 230 pivoted at 231 and urged by a spring 232 into engagement with a snail cam 233 on the shaft 222. The snail cam 233 controls the movements of the shutter 226 so that the shutter is positioned over the receiver 14 immediately the posting card is received therein and the stock card which, as stated above, is following closely behind the posting card over the shutter 226 and is guided into the receiver 15 by a fixed guide 226a. Thus the receiver 14 receives only posting cards and the receiver 15 receives only stock cards and the amalgamated pack which was placed into the magazine 1 is sorted at the delivery end of the machine into its two constituent packs comprising, respectively, posting and stock cards.

When, however, the posting card is to be delivered to the receiver 15 and the stock card to the receiver 14 the mechanism just described for ensuring the delivery of the cards to the respective receivers is modified as shown in Figure 24.

Referring to Figure 24, the link 229 is connected to the bell crank 230 through a slot 229a and spring 230a connection, the slot 229a engaging a pin 230b on the bell crank 230. A latch 229b is pivoted at 229c to the machine frame and has a tail 229d urged by a spring 229e towards a pin 233a projecting from a face of the snail cam 233. The latch 229b co-operates with an abutment 229f on the link 229.

With this arrangement although the bell crank 230 is engaged by the high portion of the snail cam 233 the shutter 226 does not open until the posting card has passed over it to the receiver 15 because the link 229 remains in its latched position. However, as shown in Figure 24, shortly before the bell crank 230 drops onto the low portion of the cam 233 the pin 233a engages the tail 229d of the latch 229b and rocks the latch clockwise, as viewed in Figure 24, thus releasing the link 229 which then, under the action of spring 230a, moves to rock the arm 228 and open the shutter 226 so that the stock card is directed thereby into the receiver 14. When the bell crank 230 drops onto the low portion of the cam 233 under the action of spring 232 the link 229 is moved to effect closing of the shutter 226 and the latch 229b is again engaged with the abutment 229f on the link 229.

Accordingly, when the mechanism shown in Figure 24 is employed the receiver 14 receives only stock cards and the receiver 15 receives only posting cards.

As the cards pass to the receivers 14 and 15 they pass beneath a detector comprising a flap 237, Figure 3C, secured to a spindle 238 to an end of which is secured a lever 239 connected to a link 240. The link 240 is connected at its opposite end to a latch 241, Figure 3B, mounted on the pivot 170 together with the bell crank 169.

When a card passes under the flap 237 the lever 239 is rocked clockwise thus pulling the link 240 and rocking a latch 241 counter-clockwise into position beneath a projection shown as a pin 242 carried by a knock-off link 243. The link 243 corresponds to the link 111 described in the aforesaid specification No. 478,597 and operates, in the manner described in that specification, to stop the machine if a card does not pass beneath the flap 237 at the appropriate time. The raising of the flap in the manner just described prevents the machine from being stopped thus permitting continuous running of the machine while cards are being successively fed thereto.

As it takes five cycles of the main shaft 2 for a pair of cards comprising a posting card and a stock card to pass through the machine it is desirable that automatic means be provided for holding down the starting handle 247 when running of the machine is first initiated. If such means are not provided the handle must be manually held down until the machine is primed with cards otherwise the non-passage of cards beneath the flap 237 during the initial cycles of the machine will cause the machine to be stopped. To this end a latch 244, Figure 3A, is pivoted at 245 and engages a pin 246 on the starting handle 247. To the latch 244 is connected a link 248, Figures 3A and 3B, which carries a roller 249 engaging the cam 155 which controls the card stop 12 in the printing position. Shortly after depression of the starting handle 247 the roller 249 falls off the peak of the cam 155 thus rocking the latch 244 about its pivot 245 and the starting handle 247 accordingly remains down during the remainder of the cycle of the auxiliary shaft 7 which is the equivalent of five cycles of the main shaft 2. By the time the cam 155 commences its second cycle the latch 244 will be disengaged from the starting handle but cards will now have reached the pivoted flap 237 and control of the operation of the machine will be by the flap 237 through the link 243 and the mechanism described in the aforesaid specification No. 478,597.

While the posting card is being printed upon, the actuating link 161 is lowered out of the path of the abutment 162 so that the arm 171 of bell crank 169 is positioned beneath the pin 242 on link 243 thus preventing the machine from being stopped during the printing operation by reason of the actuation of the link 243.

Operation

At the commencement of an operation an amalgamated pack containing alternate posting and stock cards is disposed in the magazine 1 and the starting handle 247 is depressed so that the machine is conditioned to run for five consecutive cycles of the main shaft 2 as described above. During the first cycle the bottom card in the magazine, which is a posting card, is fed from the magazine by the picker 16 to the feed rollers 17 which feed it into the sensing chamber where it is located in sensing position by the card stop 5. The posting card, Figure 22, is a normal sixty-five column record card without the printed matter which is usually provided thereon and in the example about to be described, it has punched therein data representing the serial number associated with a particular client's name and also is provided with perforations indicating the amount to be printed on the card. As can be seen from Figure 22, the serial number is punched in a field comprising columns one to eight of the card and the perforations shown in Figure 22 represent the Serial Number 13,234,630, these figures being punched respectively in positions which, in an indexed card, would correspond to card columns one to eight in that order. The amount which is also to be printed on the card as shown in Figure 22 is punched in position which, in an indexed card, would correspond to card columns fifty-nine to sixty-four of the card and, in the example given, represents the sum of £42.6.3. As can be seen from Figure 22 the amount appears in figures at the extreme righthand side of the card and in the same line is repeated partly in words and partly in figures, the pounds being printed in words while the shillings and pence are repeated in figures. The amount which is printed wholly in figures is represented by the perforations 250, while the perforations 251 and 252 represent respectively a four and a two, the amount of the pounds to be printed in words.

The direction of movement of the cards through the machine is indicated by arrows in Figures 17 to 23 and when the posting card has been arrested by the card stop 5 the sensing pins 67 are lowered to effect sensing of the card and certain of the pins pass through the perforations formed in the card as shown in Figure 22. During this operation the latches 78 and 84 are open so that shutters 74 and 77 permit sensing of card columns one to eight and fifty-nine to sixty-five and latches 80 and 83 are closed, preventing sensing in card columns nine to fifty-eight, as diagrammatically shown in Figure 17. Movement of the sensing pins which pass through perforations in columns one to eight and fifty-nine to sixty-five is transmitted to the connection wires 104 associated therewith and thence to the stops 105 to determine the extent of movement of the type-setting slides 109.

As can be seen from Figure 22, although the perforations 250 are in adjacent vertical card columns, when the printing is effected on the card, the data recorded from these perforations is spaced apart over a greater number of vertical card columns. This is effected by the use, in known manner, of Y-wiring in the connection box. Similarly although only two holes 251 and 252 are provided, by the use of suitable Y-wiring these two holes control the stops 105 to effect printing of the words "forty-two."

Also during the first cycle of the main shaft 2 the posting card, after being sensed, is released by the card stop 5 and is fed by feed rollers to printing position where it is arrested beneath the type wheels 13 by the card stop blocks 12, the hammers 176 corresponding to card columns one to eight and thirty-four to sixty-five being fired to effect printing as shown in the bottom line 253, Figure 22. During the printing of this line the latch 206 is operated by the cam 220 to prevent firing of the hammers in columns ten to thirty-four. Also at this time the stop 114 is operated to prevent movement of the slides associated therewith. Thus although, as shown in Figure 22, in card columns thirty-seven to sixty-five dashes are provided where no character is printed and no dashes are printed between the serial number and the card columns in which the amount is printed.

During the second cycle of the main shaft 2 the stock card associated with the posting card is fed from the magazine 1 and is delivered to the sensing chamber where it is arrested by the card stop 6.

As can be seen from Figure 23, the stock card is similar to the posting card shown in Figure 22 but is provided with twelve horizontal rows 254 of index positions arranged in sixty-five vertical columns and is also adapted for perforation in interstage horizontal rows 255, these positions being, in known manner, disposed between the normal horizontal rows 254.

Figure 18:
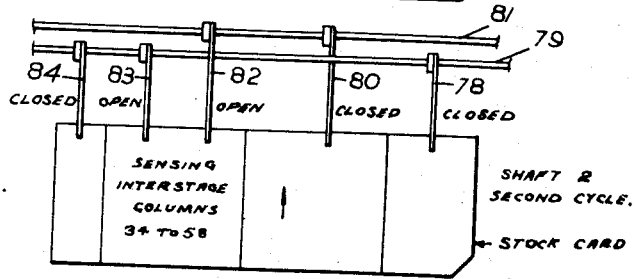

When the stock card is arrested by the card stop 6 it is in position to permit sensing of the interstage rows 255 and during the said second cycle of main shaft 2 the latches 78, 80 and 84 are closed and the latches 82 and 83 are open, as indicated in Figure 18, so that only the sensing pins corresponding to the vertical card columns thirty-four to fifty-eight are free to pass through perforations formed in the interstage positions 255 in those columns. In the example being described the perforations formed in the interstage positions in the card columns thirty-four to fifty-eight represent the word "Scotland," and this information is transmitted to the type wheels corresponding to card columns ten to thirty-four and the hammers 176 for those columns are fired thus effecting printing of the word "Scotland" on the horizontal line 256 of the posting card, as shown in Figure 22, this card having been advanced with the card stop blocks 12 to the new line position by the mechanism 159, 150a, 150b, 152, 152a, 152b, 153 described above. During printing of the line 256 the latches 205 and 207 prevent printing in columns one to eight and thirty-seven to sixty-five so that no dashes are printed in these columns on the posting card.

Figure 19:
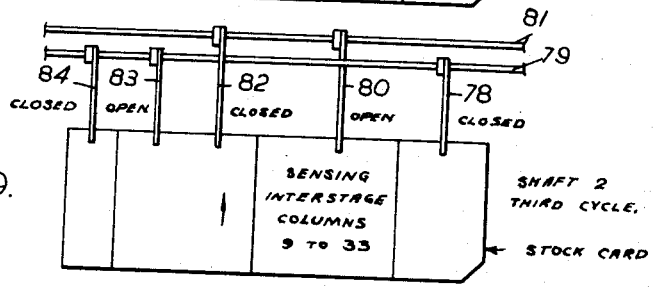

During the third cycle of the main shaft 2 the latches 78, 82 and 84 are closed and only the shutter 75 is free as indicated in Figure 19, with the result that the interstage positions 255 in stock card columns nine to thirty-three are sensed, the perforations indicated in these columns in Figure 23 representing the word "Aberdeen" which is accordingly set up in the type wheels and printed on the posting card which is again advanced together with the card stop blocks 12 to the new horizontal line printing position 257. During the printing of the word "Aberdeen" latches 205 and 207 again prevent printing in columns one to eight and thirty-seven to sixty-five so that no dashes are printed in these columns of the posting card.

During the fourth cycle of the main shaft 2 the card stop 6 is lowered and the stock card is advanced to be arrested by the card stop 5 which locates the card in the sensing chamber in a position at which the normal rows 254 of perforations can be sensed. During this cycle the latches 78, 80 and 84 are closed and the latches 82 and 83 are open, as indicated in Figure 20, so that sensing is effected only in the normal rows 254 of stock card columns nine to thirty-three, the information punched in these normal rows representing the address "25 Commercial Road" which as shown in Figure 22 is printed on the posting card which has again been advanced together with the card stop blocks 12 to the new horizontal line printing position 253. During this fourth cycle the latches 205 and 207 again prevent printing in columns one to eight and thirty-seven to sixty-four so that no dashes are printed in these columns of the posting card.

During the fifth cycle of the main shaft 2 the latches 82 and 83 are closed and the latches 78, 80 and 84 are open as indicated in Figure 21, so that sensing is effected in stock card columns one to eight, nine to thirty-three and fifty-nine to sixty-five. As, however, no information is punched in columns fifty-nine to sixty-five only information from columns one to eight and nine to thirty-three is printed on the posting card. The information contained in these two fields is a serial number corresponding with the serial number punched in the posting card and also the name "John Doeg" and this information is accordingly printed on the posting card, as shown in Figure 22, the card having again been advanced together with the stop blocks 12 to the new horizontal line printing position 259. During the printing of the line 259 the latch 207 is operated by its cam 221 to prevent printing in columns thirty-seven to sixty-five so that no dashes are printed in these columns of the posting card.

Thus at the end of the fifth cycle of the main shaft 2 the posting card has information printed thereon as shown in Figure 22 and the card is then released by the card stop blocks 12 which are withdrawn from its path by the cam 167, plate 163, link 161, and members 156, the card being delivered by feed rollers into the receivers 14 or 15 as described above. The stock card which has been retained in the sensing chamber during the last four cycles of the operation is released by the card stop 5 a short interval before the posting card is released by the card stop blocks 12 with the result that the stock card is advanced by the feeding rollers to a position in close proximity with the trailing edge of the posting card at the time when the posting card is released by the card stop blocks 12. Thus both cards are delivered from the machine in close succession as described above.

The cycle of operations just described above is repeated while cards remain in the magazine 1 or until a detector, such as the flap 237, is operated to signal that the machine is not functioning correctly, when the machine is automatically stopped.

From the foregoing it will be understood that during the single passage of a posting card through the machine there has been printed thereon, in a plurality of different line printing positions, data sensed from the posting card and from a plurality of predetermined fields of a stock card.

If desired, however, the posting card may consist of a plain card having no data perforated therein, in which event the data printed in the different line positions will be all derived from the stock card and the sensing mechanism and printing mechanism will be rendered ineffective during the first cycle of the main shaft 2 as will be well understood by those skilled in the art, or the posting card may be fed directly from the magazine 1 to the card stop blocks 12 in the printing position.

Further, in the example hereinbefore described, the stock card has been provided with data representative of a name and address. If desired, however, the data contained in the stock card may be other than that of the character herein described.

I claim:

1. A machine for printing on a card, including sensing means comprising a pin box, printing mechanism selectively controlled thereby, means to feed posting and stock cards in succession through the machine, means to retain a posting card in different printing positions for a plurality of consecutive cycles of the machine, means including a plurality of stops to retain a stock card in different sensing positions beneath the pin box for a plurality of consecutive cycles of the machine, means to control the sensing means so that sensing of data in normal and interstage locations of a different field or fields in said stock card is or are effected during each cycle, means selectively controlled by the pins of the pin box to transmit data sensed during each cycle to the printing mechanism, means to effect operation of the printing mechanism after transmission of said data thereto, and means comprising a card gate movable in the direction of the plane of the card to advance the posting card to a new line printing position during each sensing of the stock card, whereby data sensed from said normal and interstage locations during consecutive cycles while the stock card is in different sensing positions is printed in different line positions on the posting card during the single passage of the card through the machine.

2. A machine according to claim 1, wherein the means for retaining a card in sensing position comprises one of said plurality of stock card retaining stops arranged to arrest a posting card for one sensing operation and to release the posting card for advancement to the printing position prior to the stock card being admitted to a first sensing position against another of said plurality of stops, means for transmitting data sensed from the posting card to the printing mechanism and means for printing said data on the posting card at the printing position, whereby data sensed from the posting card and stock card is printed on said posting card during the single passage of the posting card through the machine.

3. A machine for printing on cards including sensing means to sense data recorded on a record card comprising a sensing pin box, printing mechanism selectively controlled by the sensing pins including type wheels and associated hammer mechanisms to print an impression on a record card, transmission elements including rods, sliding racks and gear sectors directly controlled by the sensing pins to effect setting of the type wheels in accordance with the data sensed from a record card, means to feed a posting card and a stock card in succession to the sensing means, stop means to arrest each card in one position for sensing by the sensing means and to retain the stock card in said one position and in another sensing position for a plurality of sensing operations effected during consecutive machine cycles, cyclically operable means for disabling predetermined groups of sensing pins to determine the card field sensed during each cycle, and means comprising a card gate movable stepwise in the direction of the plane of the card operable in timed relation with the sensing means to locate the posting card in successive line printing positions with respect to the type elements, whereby data sensed from the posting card is printed in one line thereon and data subsequently sensed from the stock card during successive sensing operations effected on the stock card is printed in successive line positions on the posting card during a single passage of the posting card and stock card through the machine.

4. A machine for printing on cards comprising a positively rotated main shaft, an auxiliary shaft driven by the main shaft through reduction gearing so that the main shaft makes a predetermined number of revolutions for each revolution of the auxiliary shaft, sensing means comprising a pin box operable by the main shaft to sense data recorded on a record card, printing mechanism including type wheels operable in timed relation with the sensing means under control of the sensing pins thereof and including type wheels and associated hammer mechanism to print an impression on a record card, transmission elements selectively operable by the sensing pins comprising selectively operable slidable racks and gear segments interconnecting the racks and the type wheels to effect setting of the type wheels in accordance with the data sensed from a record card, card picker means to feed a posting card and a stock card in succession to the sensing means, means comprising a card gate to arrest each card in a position for sensing by the sensing means and to retain a stock card in sensing position for a plurality of sensing operations effected during consecutive cycles of the main shaft, sensing pin disabling means operable by the auxiliary shaft to determine the card field or fields sensed during each cycle of the main shaft, and stop means comprising a card gate displaceable to any of a series of different predetermined positions in the direction of the path of the card operable in timed relation with the main and auxiliary shafts to locate the posting card in successive line printing positions with respect to the type elements, whereby data sensed from the posting card is printed in one line thereon and data sensed from different fields of the stock card during successive sensing operations effected in respect thereof is printed in successive line positions on the posting card during a single passage of the posting card through the machine.

5. A machine according to claim 4, wherein the card feeding means comprises a picker mounted for reciprocation beneath a magazine, arms supporting the picker and mounted for rocking movement with a spindle, a pair of connecting arms one of which is free on the spindle and the other of which is fixed thereto, said fixed arm being resiliently connected to said arm which is free on the spindle and carrying an abutment for engagement with the free arm an eccentric strap driven from the main shaft and connected to the arm freely mounted on the spindle, a latch to engage a lateral abutment on a further arm on said spindle, and a cam on said auxiliary shaft to control said latch, whereby when the latch is engaged with said lateral abutment movement of the picker is restricted and the picker is rendered ineffective for feeding a card from the magazine.

6. A machine according to claim 4, wherein a first one of a pair of card gates is adapted during a first cycle of the main shaft to arrest a posting card in sensing position and then to release the card for passage to the printing position and during a second and third cycle of the main shaft the second one of the card gates is adapted to retain a stock card in a position to be twice sensed by said sensing means and to then release the stock card for advancement to a second position at which it is arrested by said first one of the card gates to be again, during a fourth and fifth cycle of the main shaft, twice sensed by the sensing means, said first one of the card stops being arranged towards the end of said fifth cycle to release the stock card for ejection from the machine.

7. A machine according to claim 4, wherein the card gates are independently operable, each gate being resiliently urged to card arresting position and withdrawn from said position by means controlled by a cam on the main shaft, and wherein means operated from the auxiliary shaft is arranged to retain the gates in card arresting positions during said second and third and said fourth and fifth cycles of the main shaft.

8. A machine according to claim 4, wherein the sensing pin disabling means comprises a plurality of independently operable shutters with springs urging said shutters in one direction, a restoring device for returning the shutters against the action of the springs, means under control of the main shaft and operative at each reciprocation of the pin box to cause said restoring device to perform a restoring operation, and latch means for each shutter adapted under control from the auxiliary shaft to engage the associated shutter and hold it in the restored position.

9. A machine according to claim 6, wherein the transmission elements include stop rods which control the operation of the sliding racks for transmitting a setting to the type wheels and including in combination with said racks a stop for each of a predetermined group of racks and further stop operating means for the racks actuated by the auxiliary shaft whereby the stops are selectively operated to prevent a setting movement of racks associated with columns in card fields not sensed during a sensing operation.

10. A machine according to claim 4, wherein two stops are provided, one for each of a predetermined group of racks, the stops being mounted for operation by concentric shafts disposed one in the other, an actuating link being connected with each said concentric shaft and operated by a cam on the auxiliary shaft.

11. A machine according to claim 4 wherein the hammer mechanism includes a transmission rod and a hammer for each column and has in combination therewith a latch for each of a predetermined group of hammers, and latch operating means actuated in timed relation with the auxiliary shaft whereby a latch or latches is or are selectively operated to prevent engagement of the transmission rods by the hammers of a group or groups thereof associated with columns in card fields not sensed during a sensing operation.

12. A machine according to claim 4, wherein fixed latches are associated with predetermined hammers permanently to prevent engagement of the transmission rods associated with said predetermined hammers.

13. A machine according to claim 4 wherein the card gate for locating a posting card in printing position is reciprocable into and out of the path of the card under control of the main shaft and is positioned in line printing positions under control of the auxiliary shaft, cam means operable under control of the auxiliary shaft being provided to determine the interval during which the stop means remains in card arresting position prior to its being withdrawn from the card path under control from the main shaft.

14. A machine according to claim 4, wherein the second mentioned card gate is supported between guide members for movement along the path of a card and has associated therewith toothed racks engaged by toothed quadrants secured to a shaft to which is secured a further toothed quadrant adapted for angular movement by a further toothed rack supported by a link which is progressively movable in one direction by a cam on the auxiliary shaft, whereby the stop means is moved to position a card in successive line printing positions.

15. A machine according to claim 4, in which a member is adapted to engage a projection extending laterally from a support for the second mentioned card gate and under control of a cam on the main shaft to withdraw the card gate from the card path, said member being actuated by an actuating link arranged for endwise engagement by an abutment on a reciprocable plate movable by said cam, in combination with a trip link connected with the actuating link and with one arm of a bell crank mounted for angular movement by a link operated by a cam on the auxiliary shaft, said bell crank when rocked in one direction effecting movement of the trip link to move the actuating link out of the path of said abutment so that the stop means remains interposed in the card path.

16. In a machine of the character described, card feed means, means for sensing a posting card having rows of data representations perforated in normal arrangement in different fields thereof and for sensing a stock card having rows of data representations perforated in normal and interstage arrangements in different fields thereof, means for controlling the sensing means for cyclically sensing successively selected fields of said posting and stock card, dual stop means for holding the posting card for sensing of the normally arranged perforations therein in a first cycle, mechanism selectively controlled by said sensing means for printing on the posting card the data sensed in said posting card and in said stock card, means for arresting the posting card at line by line printing position, and means for operating said dual stop means to hold the stock card at one position for sensing of the interstaged positioned data of different fields thereof in the second and third cycles and for holding the stock card at another position for sensing of the normally positioned data of different fields thereof in the fourth and fifth cycles.

ARTHUR WILLIAM EXCELL.

References Cited in the file of this patent
UNITED STATES PATENTS

| Number | Name | Date |
|---|---|---|
| 1,608,837 | Bryce | Nov. 30, 1926 |
| 2,016,709 | Eichenauer | Oct. 8, 1935 |
| 2,053,063 | Bryce | Sept. 1, 1936 |
| 2,059,797 | Kirkegard | Nov. 3, 1936 |
| 2,110,854 | Fuller | Mar. 15, 1938 |
| 2,131,913 | Bryce | Oct. 4, 1938 |
| 2,131,919 | Mills | Oct. 4, 1938 |
| 2,157,980 | Daubmeyer | May 9, 1939 |
| 2,189,046 | Smith | Feb. 6, 1940 |
| 2,415,279 | Daly | Feb. 4, 1947 |
| 2,424,076 | Buhler | July 15, 1947 |